Patented Feb. 12, 1929.

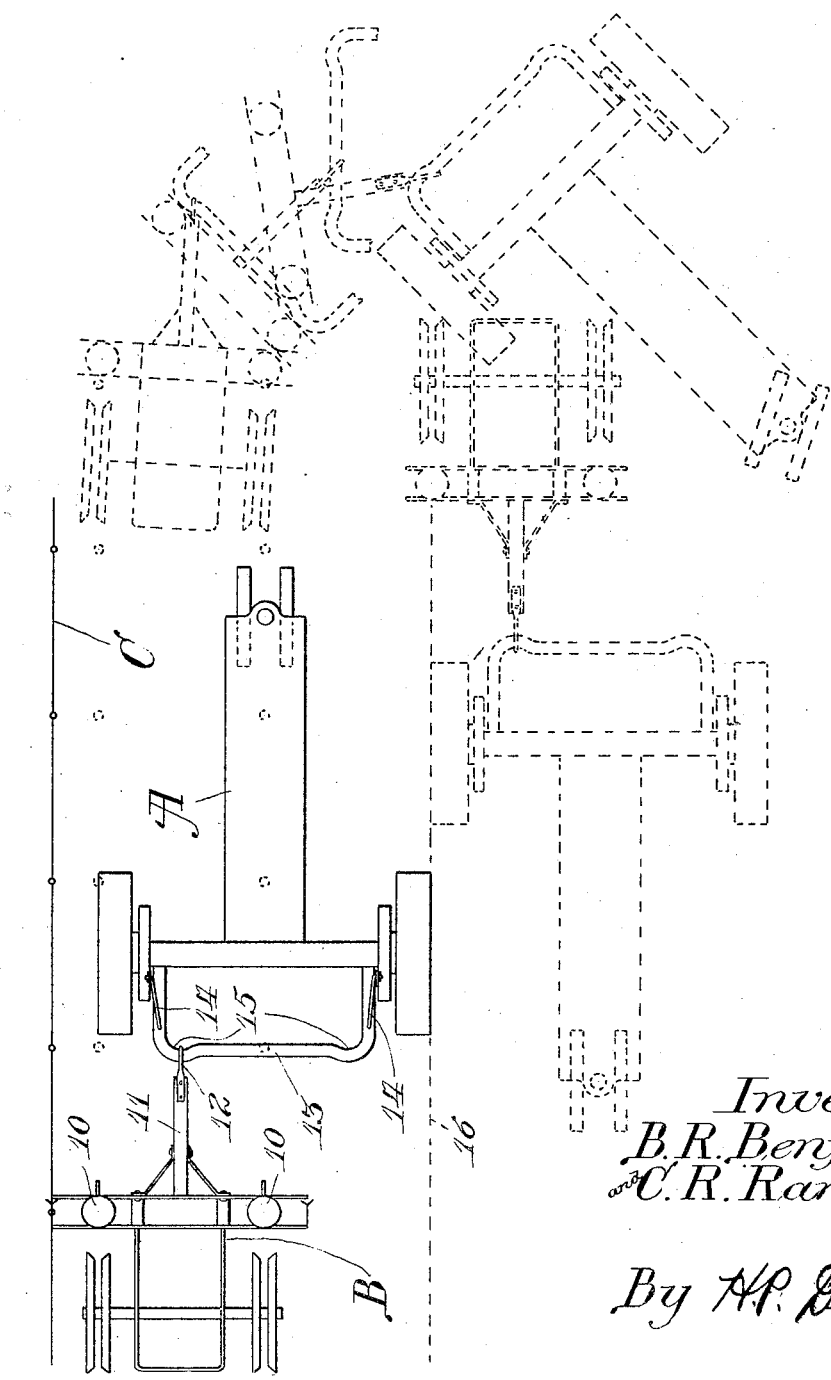

1,701,745

UNITED STATES PATENT OFFICE.

BERT R. BENJAMIN, OF OAK PARK, AND CLEMMA R. RANEY, OF RIVERSIDE, ILLINOIS, ASSIGNORS TO INTERNATIONAL HARVESTER COMPANY, OF CHICAGO, ILLINOIS, A CORPORATION OF NEW JERSEY.

PLANTER DRAFT DEVICE.

Application filed September 28, 1923, Serial No. 665,273. Renewed June 28, 1926.

The present invention relates to improvements in planting apparatus and is directed particularly to means for facilitating the operation of a check-row planter in connection with a tractor.

The object of the invention is to provide a structure that will serve to mark the course of the plant rows and accurately gage and maintain a predetermined distance between rows and the action of which will be largely automatic and, therefore, labor saving. This is accomplished by provision of a novel form of draft connection between a tractor and a planter or other row crop implement characterized by a transversely extending draw bar of novel form to which a freely movable clevis is attached, the clevis being connected to the implement traveling from one end to the other of the draw bar when turns are made at the ends of the rows, thereby shifting the implement from one side of the tractor to the other and, further, by employing a draft vehicle or tractor having ground wheels which are so spaced that a previous wheel track serves to guide the course of the apparatus.

The invention accordingly involves a novel manner of operating a planter in combination with a tractor, and the invention resides in the novel organization and construction of parts, or the equivalents thereof, hereinafter described and claimed.

In the accompanying drawing, the tractor and planter arrangement and construction of draft connection are shown in full lines while the successive positions assumed by the elements of the organization during a turn are shown at quarter, half, three-quarter, and full turn, respectively, in dotted lines.

On the drawing, A designates a draft vehicle, in this instance represented as a tractor of the wide tread type, and B designates an ordinary two row check-row planter adapted to be actuated by the usual check-row wire C. The distance between rows to be planted is, of course, determined by the position of the planting elements 10 on the planter and in this case they will be considered as forty-two inches apart, this being the spacing ordinarily employed in actual practice of check-row corn planting. In the practice of the invention, the planter so equipped is connected to the tractor by means of a draft tongue 11 provided with a clevis 12, which is hook shaped to engage over an arched or U-shaped draw bar 13, the arms of which are pivoted to the rear end of the tractor and supported thereon at the desired height by the rods 14. The bight or transversely extended portion of the draw bar 13 is equal in length to the distance between the planting elements 10 on the planter and at the ends of this portion the inner or forward edge of the bar is formed with rounded bends 15 constituting seats for reception of the hook of clevis 12, which is freely slidable on the bar. The structure so far described may be employed with a draft vehicle or tractor of any type, providing that the usual marker is in use on the planter or implement if it is desired to maintain uniform spacing between rows, the operation being as follows:

During the turn at the ends of the rows the clevis hook will ride out of the seat 15 at one end of bar 13, when a certain angular relation of the tractor and planter is reached, and travel along the bar until it reaches the opposite seat 15, when the apparatus will straighten out and assume the final dotted line position of the drawing, the planter having been automatically shifted, during the process of turning, from one side of the tractor to the other. If a narrow tread tractor is being used, the furrow left by the marker guides the course of the apparatus and uniform distance between rows is easily maintained. It will also be evident to those skilled in the art that there will be no interference from the tractor with the check-row wire, as the planter is held in such position relatively to the tractor that the check fork projects well beyond the path of the tractor wheel.

For practice of the invention in its complete and preferred form, a draft vehicle or tractor having a predetermined width of tread is employed and on the drawing a tractor is shown having rear wheels spaced apart a distance twice that between the planting elements 10; that is, the distance between the outer edges of the wheel tracks is eighty-four inches, and, as the draw bar 13 is half that length and is positioned between the wheels, the outer edge of the wheel tracks will register with or mark the location of the plant rows and the course of the apparatus while planting successive rows is guided by the outer edge of wheel mark 16 made on the opposite trip, as clearly illustrated on the drawing. This does away with the marker usually employed with a planter and provides a well defined track, easily followed and accurately gaging the distance between successive plant rows.

The structure here specifically described exemplifies what is now regarded as the preferred embodiment of the invention, but it will be evident to those skilled in the art that considerable variation therefrom is possible without departing from the gist of the invention as defined in the following claims.

We claim as our invention:

1. In planting apparatus, the combination of a draft vehicle, a planter, a connection between the vehicle and planter comprising a draw bar having a transversely extended portion, a coupling element freely movable therealong, and means for normally retaining said element at one end of said portion of the draw bar during forward travel and permitting it to move to the opposite end thereof when a certain angle between the vehicle and planter is reached while turning, and retaining the clevis in this new position at the end of the draft bar during renewed forward movement of the draft vehicle.

2. In check-row planting apparatus, the combination of a draft vehicle, a two row planter, and a connection between the vehicle and planter comprising a draw bar having a transversely extended portion, the length of which is equal to the distance between the planting elements of the planter, and a coupling element freely movable thereon from end to end, whereby the planter is automatically maintained in proper relation to the vehicle.

3. In check-row planting apparatus, the combination of a two row planter, a draft vehicle including ground wheels spaced apart a distance twice that between the planting elements of the planter, and a connection between the vehicle and planter comprising a draw bar positioned between said wheels and having a transversely extended portion, the length of which is equal to the distance between the planting elements of the planter, and a coupling element freely movable on said bar from end to end, whereby a wheel track serves to mark the course and uniform spacing is automatically maintained between rows.

4. In check-row planting apparatus, the combination of a draft vehicle, a planter, a transversely extending draw bar connected at its ends to the vehicle, a draft tongue on the planter having a clevis engaging said bar and freely movable therealong, said bar having a seat adjacent each end thereof in either of which the clevis may lodge and to be retained in either of said seats by the draft forces developed during straight forward movement to offset the planting apparatus in trailing relation with respect to the draft vehicle.

5. In check-row planting apparatus, the combination of a draft vehicle, a two row planter, a transversely extending draw bar connected at its ends to the vehicle and having a pair of seats in its forward edge spaced apart a distance equal to that between the planting elements on the planter, and a draft tongue on the planter provided with a clevis having a hooked portion slidably engaging said bar and adapted to lodge in either of said seats.

6. The combination with a tractor and a movable body, of means attaching said body to the tractor to operative position off-set at one side of the longitudinal central line thereof and automatically operating to transfer said body to operative position off-set at the opposite side of said line by a turn of the tractor in that direction.

7. In an implement attachment for tractors, the combination of a U-shaped drawbar the arms of which are adapted for connection to a tractor and the bight portion of which is straight and elongated and formed with seats at each end, and an implement having a draft clevis shiftably engaging the bight portion of said drawbar and engageable in either seat, said clevis being held in either seat by the draft force developed during straight forward travel and being dislodged therefrom and shifted towards the opposite seat upon horizontal angular movement of the drawbar due to turning movement of the tractor.

8. The combination of a tractor, a row-crop implement having operating units thereon spaced apart the predetermined distance between plant rows, a transversely extending drawbar on the tractor having a clevis receiving seat at each end, said seats being also spaced apart the predetermined distance between plant rows, a draft clevis on the implement slidably engaging the drawbar, and means comprised in the structure of the drawbar and seats for causing the draft clevis to shift along the drawbar from one seat to the other during reverse turns of the tractor at the row ends, thereby automatically maintaining the implement in offset relation to the tractor and the operating units thereon in proper relation to the predetermined row spacing.

In testimony whereof we affix our signatures.

BERT R. BENJAMIN.
CLEMMA R. RANEY.